United States Patent
Asai

(10) Patent No.: US 8,004,937 B2
(45) Date of Patent: Aug. 23, 2011

(54) OPTICAL PICKUP AND OPTICAL DISK APPARATUS

(75) Inventor: Yoshikazu Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 11/468,891

(22) Filed: Aug. 31, 2006

(65) Prior Publication Data

US 2007/0067787 A1     Mar. 22, 2007

(30) Foreign Application Priority Data

Sep. 20, 2005  (JP) ................. 2005-272079

(51) Int. Cl.
*G11B 7/00*     (2006.01)

(52) U.S. Cl. .................................... 369/44.15

(58) Field of Classification Search .......... 720/681, 720/685, 686, 682; 369/44.16
See application file for complete search history.

(56) References Cited

U.S. PATENT DOCUMENTS

| | | | |
|---|---|---|---|
| 5,742,440 A * | 4/1998 | Marino | 359/814 |
| 2003/0156529 A1* | 8/2003 | Tajiri | 369/244 |
| 2004/0070850 A1* | 4/2004 | Kim et al. | 359/811 |
| 2004/0177365 A1* | 9/2004 | Takeshita et al. | 720/683 |

FOREIGN PATENT DOCUMENTS

JP     2000-57603     2/2000

* cited by examiner

Primary Examiner — Daniell L Negron
Assistant Examiner — Carl Adams
(74) Attorney, Agent, or Firm — Fitzpatrick, Cella, Harper & Scinto

(57) ABSTRACT

There is provided a optical pickup in which a movable part is support by a fixed part through an elastic supporting member, one end of the elastic supporting member being fixed to a support base and the other end of the elastic supporting member being fixed to an terminal protrusion of a lens supporting member, and moreover, the winding wire of a driving coil entwined with the terminal protrusion is electrically connected to the elastic supporting member. At this time, the terminal protrusions adjacent in the height direction of the lens supporting member are formed so as to protrude in different directions from the surface of the lens supporting member.

6 Claims, 8 Drawing Sheets

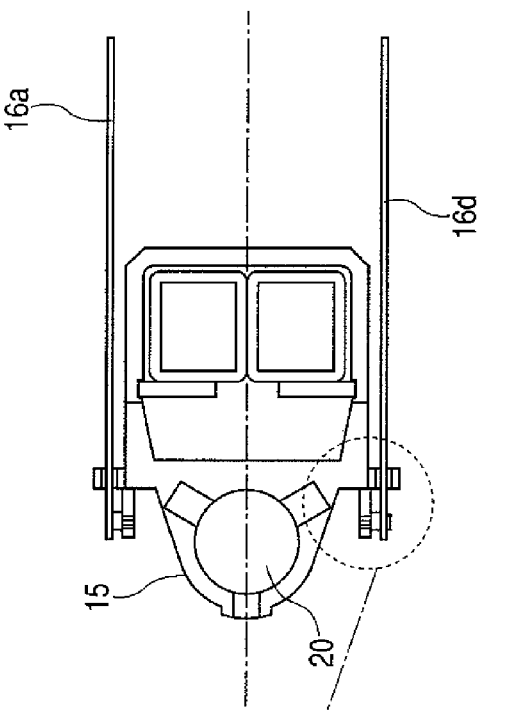
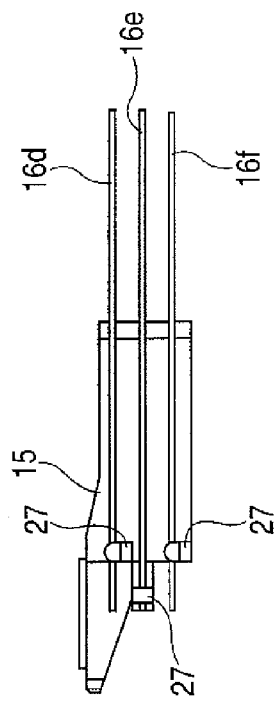
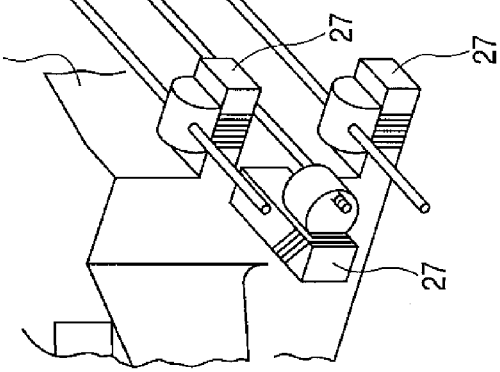
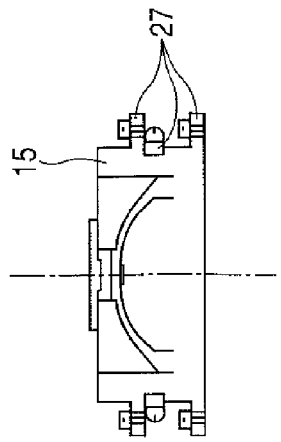

--- PLANE ORTHOGONAL TO OPTICAL DISK INCLUDING TANGENT LINE OF RECORDING TRACK IN POSITION OF OPTICAL SPOT OF OPTICAL DISK

OPTICAL PICKUP AND OPTICAL DISK APPARATUS

BACKGROUND OF THE INVENTION

1. Field of the Invention

The present invention relates to an optical pickup for recording information signals on an optical disk or reproducing information signals from the optical disk, and an optical disk apparatus using the optical pickup.

2. Description of the Related Art

FIG. 7 shows a schematic constitution of a general optical disk apparatus. In FIG. 7, reference numeral 1 denotes an optical disk, reference numeral 2 denotes an optical head, and reference numeral 3 denotes a spindle motor for rotary-driving the optical disk 1. The optical head 2 is constituted by a laser light source 6, a collimator lens 7, a beam splitter 8, a condenser lens 9, a light receiving element 10, an objective lens 20, and an actuator 11 for performing the focus control and the tracking control of the objective lens 20.

The optical disk 1 is constituted by an information signal recording layer 13 composed of a phase changing material reversibly changeable in a phase state formed on a substrate 12 and a cover layer 14 composed of a transparent resin material. A spiral or concentric recording track is formed on the information signal recording layer 13. The information signal recording layer 13 may be made of an optical magnetic recording material or a metal reflection film having pits (concavities and convexities) thereon. The optical pickup 2 is installed at the side opposing to the cover layer 14 of the optical disk 1. An optical beam for recording or an optical beam for reproduction is irradiated to the optical disk 1 from the optical pickup 2, thereby performing the recording and reproduction of the information signal.

FIGS. 8A and 8B show constitutions of the actuator 11. FIG. 8A is an oblique view, and FIG. 8B is a side view. The actuator 11 is composed of a fixed part 26 and a movable part 25. The fixed part 26 is constituted by permanent magnets 21a, 21b, and 21c, a yoke 24, and support base 17. The movable part 25 is constituted by an objective lens 20, focus coils 19a and 19b, a tracking coil 18, and a lens supporting member 15 for supporting these parts.

Elastic supporting members 16a, 16b, 16c, 16d, 16e, and 16f are linear and elastic, and have high conductivity. One end of each elastic supporting member is fixed to the support base 17, and the other end is fixed to the side surface of the lens supporting member 15 so that the movable part 25 is freely displaceable in a focus direction, tracking direction and radial and tilt direction with respect to the optical disk 1.

Here, a winding wire terminal 28 of each of focus coils 19a and 19b and a tracking coil 18 is entwined with a terminal protrusion 27 provided at the side surface of the lens supporting member 15. The elastic supporting members 16a, 16b, 16c, 16d, 16e and 16f are soldered (22) to the focus coils 19a and 19b and the tracking coil 18 on the terminal protrusion 27, so that they are electrically connected to the coils. With respect to the winding wire terminals 28, the winding wire terminal of the tracking coil 18 is entwined with the upper most terminal protrusion from among the terminal protrusions of the lens supporting member 15, and the winding wire terminal of the focus coil 19a is entwined with a second terminal protrusion, and the winding wire terminal of the focus coil 19b is entwined with a third terminal protrusion.

Further, as shown in FIG. 7, the optical disk apparatus includes an error signal generation circuit 4 and a control circuit 5 for performing a focus control, a tracking control and a tilt control of the actuator 11. The control circuit 5 provides a control current to the focus coils 19a and 19b and the tracking coil 18 through the elastic supporting members 16a, 16b, 16c, 16d, 16e and 16f.

The control circuit 5 supplies a control current based on a focus error signal and a tracking error signal to the focus coils 19a and 19b and the tracking coil 18. The actuator 11 drives the movable part 25 in three directions for the optical disk 1 by an electromagnetic force generated between this control current and a magnetic flux generated by the permanent magnets 21a, 21b and 21c. The three directions mean a focus direction for the optical disk 1, a tracking direction orthogonal to the recording track, and a radial tilt direction with a tangential direction of the recording track taken as an axis.

In this manner, even if the optical disk 1 is displaced in the focus direction by axial runout, an optical spot follows this displacement and is focus-controlled so as to accurately focus on the recording track. Further, even if the recording track is displaced in the tracking direction by radial runout, the optical spot is track-controlled so that it scans, while following this displacement. Further, the optical spot is tilt-controlled so as to compensate the influence of a disk tilt and the like.

By the way, in recent years, since the optical disk apparatus has been applied to portable instruments, for example, a recording and reproduction instruments of voices, still images, moving images and the like, the smaller size and thinner size of the optical disk apparatus have become important issues. However, in the conventional optical pickup, a size of height direction of the lens supporting member of the actuator movable part greatly depends on the layout of the terminal protrusion.

For example, Japanese Patent Application Laid-Open No. 2000-57603 discloses that a plurality of the terminal protrusions 27 integrally molded with the lens supporting member as shown in FIG. 9 are arranged at each of both sides of a plain orthogonal to the optical disk including a tangent line of the recording track in the position of the optical spot of the optical disk 1. Each terminal protrusion 27 of one side thereof protrudes in the same direction from the same surface of the lens supporting member 15, and it is, therefore, necessary to give consideration to a winding wire jig space and a soldering space within the same plane.

FIG. 10 shows a side view of a coil winding wire terminal part of the lens supporting member. The winding wire 28 of each coil is rotated and wound around the terminal protrusion 27 by the winding wire jig, and therefore, it is necessary to arrange adjacent terminal protrusions at a predetermined interval (approximately 1 mm or more) so that the winding wire jig and the terminal are prevented from interfering with each other. The winding wire jig is a jig for automatically winding the winding wire 28 on the terminal protrusion 27, and for example, as shown in FIG. 10, a winding wire jig of an approximately Φ1 mm rotates around the terminal protrusion 27, thereby winding the winding wire 28 on the terminal protrusion 27. The range shown by diagonal lines in FIG. 10 becomes a layout space for the winding wire jig.

Further, in order to solder one end of the elastic supporting member to the terminal protrusion 27, a predetermined space is required at a side where the terminal is soldered. Due to limitation on the assembly of these parts, the adjacent terminal protrusions are required to be arranged usually at the interval of approximately 1 mm or more. The interval between the terminal protrusions generates a trouble when making the lens supporting member of the actuator thin.

FIG. 11 shows a schematic illustration where the lens supporting member is made thin while maintaining the terminal interval (approximately 1 mm) as described above. As shown in FIG. 11, among the three terminal protrusions 27 at one side, the uppermost terminal is referred to as an upper terminal, the terminal in the center as a center terminal, and the lowermost terminal as a lower terminal. In this case, as shown in FIG. 11, in order to make the actuator thin, when the lower terminal is moved upward the focus ((1) of FIG. 11), it is necessary to move the center terminal either to tangential forward or backward directions.

When the center terminal is moved to the tangential forward direction, there arises a problem of interference with a mirror which is an optical component part of the optical pickup or an optical base ((2)(a) of FIG. 11). In order to avoid this problem of interference, relocation of component parts of the optical pickup is required, but because the entirety of the optical pickup is enlarged, thereby making it impossible to make the optical pickup smaller.

Further, when the center terminal is moved to the tangential backward direction, the support point of the elastic supporting member is moved backward, so that the distance between the support point of the movable part side and the fixed end of the fixed part side is shortened((2)(b) of FIG. 11). In this case, sensitivity of the actuator is deteriorated, and the increase of the tilt and the like are caused, and hence, the characteristics of the optical pickup are prone to deteriorate. Thus, in this manner, the layout of the terminal protrusion has caused a trouble when attempt is made to make the actuator thin.

SUMMARY OF THE INVENTION

An object of the present invention is to provide a thinner-sized optical pickup and an optical disk apparatus using the same.

The optical pickup of the present invention comprises: an objective lens; an objective lens driving coil; a lens supporting member for supporting the objective lens and the driving coil; a plurality of terminal protrusions for connecting the driving coil arranged in a height direction at a side surface of the lens supporting member, wherein the terminal protrusions adjacent in the height direction of the lens supporting member protrude in a different direction from a surface of the lens supporting member; a support base for supporting the lens supporting member; and a plurality of elastic supporting members each fixed between the terminal protrusion of the lens supporting member and the support base, wherein the driving coil is electrically connected to the elastic supporting member at the terminal protrusion.

Further, the optical disk apparatus of the present invention comprises the above-described optical pickup mounted thereon.

Further features of the present invention will become apparent from the following description of exemplary embodiments with reference to the attached drawings.

BRIEF DESCRIPTION OF THE DRAWINGS

FIGS. 2A, 2B, 2C and 2D are views showing a constitution of the optical pickup in Example 1 of the present invention.

DESCRIPTION OF THE EMBODIMENTS

Figure 7:
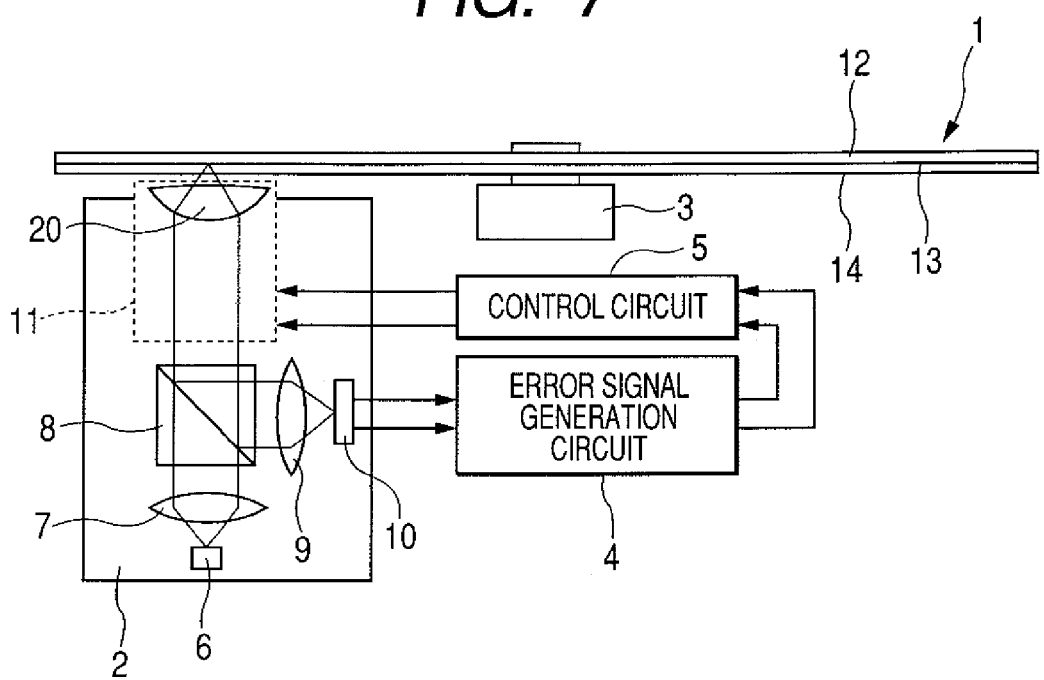
FIG. 7 is a schematic diagram showing the constitution of an optical disk apparatus.

Next, the best mode for carrying out the invention will be described with reference to the drawings. The constitution and operation of the optical disk apparatus according to the present invention are the same as those of the optical disk apparatus shown in FIG. 7, provided that the constitution of the optical pickup is different from the conventional one. The optical pickup according to the present invention is mounted on the optical disk apparatus of FIG. 7. The present invention is particularly characterized by the arrangment of the terminal protrusions in the optical pickup, and intends to make the optical pickup thin as described later.

Figure 1A:
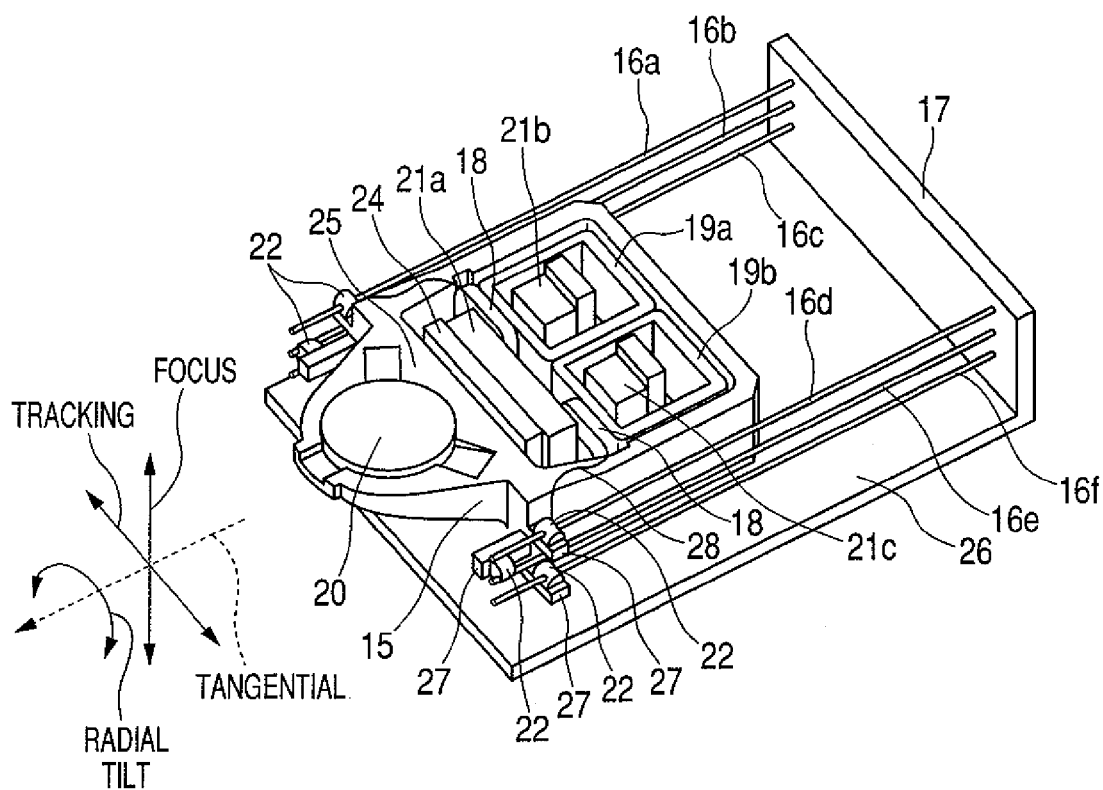
FIGS. 1A and 1B are views showing one embodiment of an optical pickup according to the present invention.
Figure 1B:
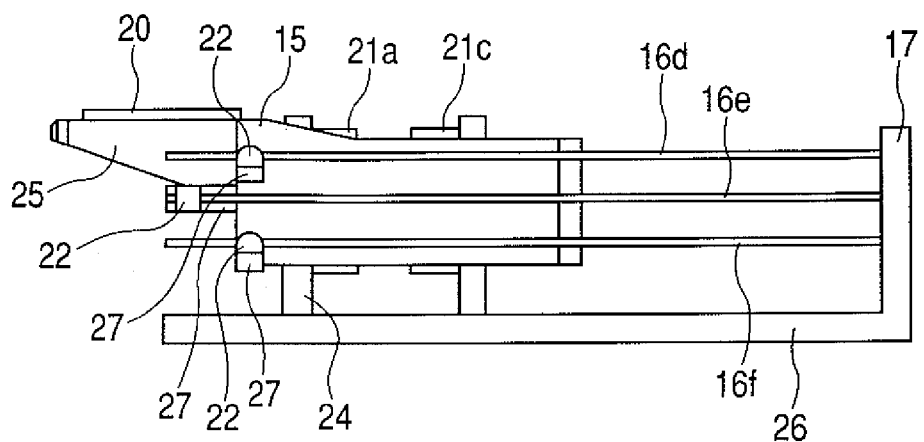
Figure 8A:
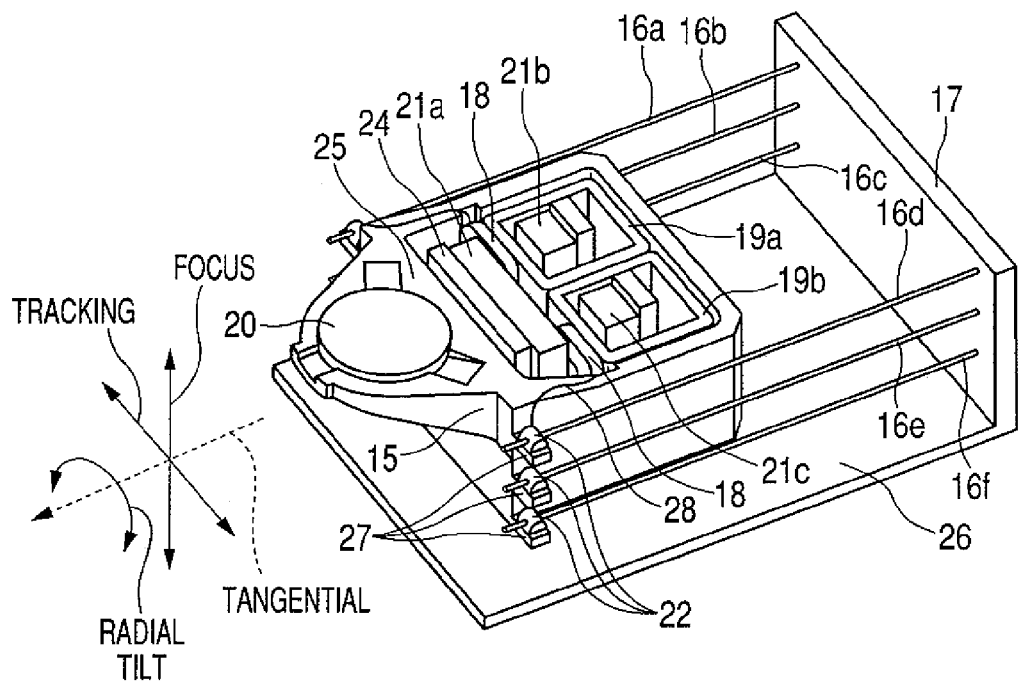
FIGS. 8A and 8B are views showing an actuator of the optical pickup in the prior art.
Figure 8B:
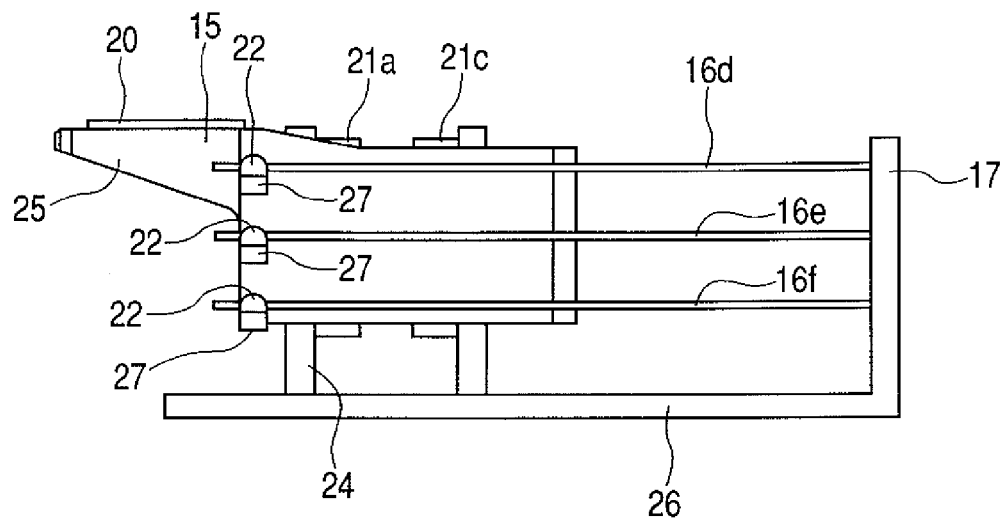
Figure 9:
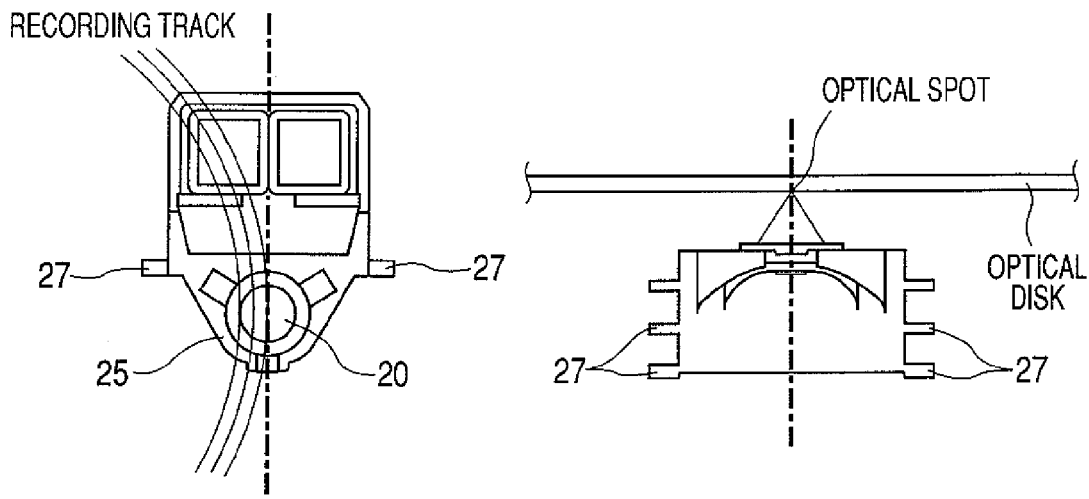
FIG. 9 is a view for explaining an terminal protrusion in the actuator of the prior art.
Figure 10:
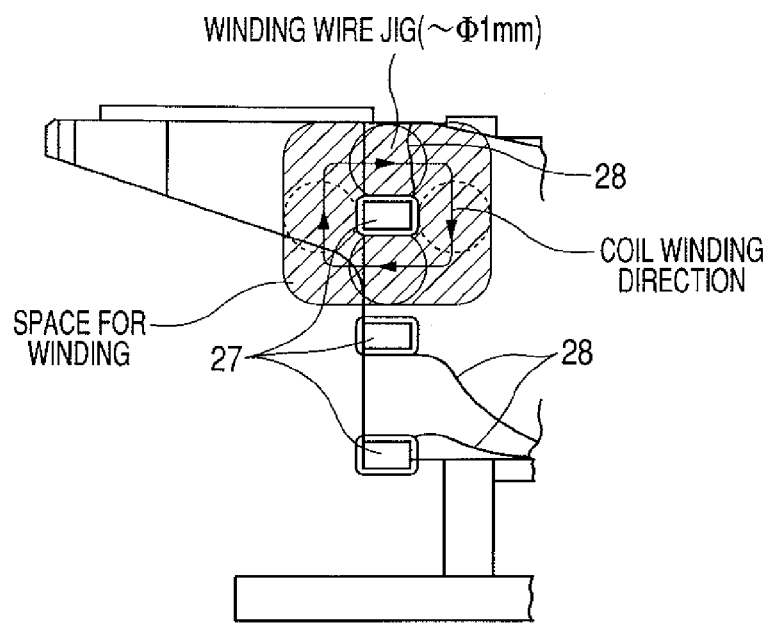
FIG. 10 is a view for explaining a winding wire jig space in the actuator of the prior art.
Figure 11:
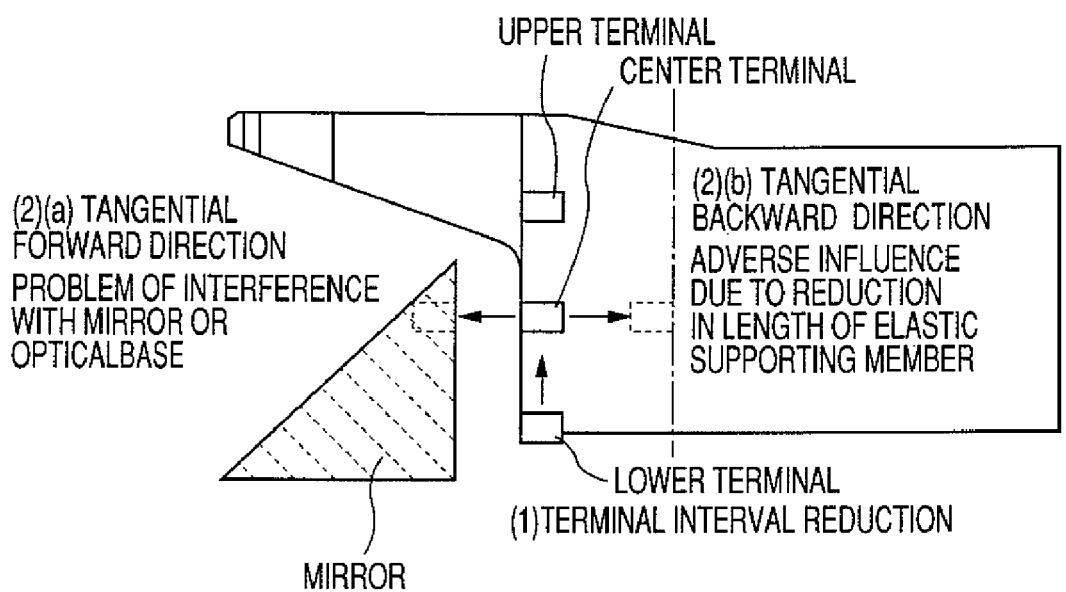
FIG. 11 is a schematic diagram for explaining problems in the actuator of the prior art.

FIGS. 1A and 1B show an actuator 11 of the optical pickup according to the present invention. FIG. 1A is an oblique view thereof, and FIG. 1B is a side view thereof. In FIGS. 1A and 1B, the same reference numerals are attached to the same parts as those of the conventional actuator of FIGS. 8A and 8B. The actuator 11 is composed of a fixed part 26 and a movable part 25. The fixed part 26 is constituted by permanent magnets 21a, 21b and 21c, a yoke 24 and a support base 17. The movable part 25 is constituted by an objective lens 20, focus coils 19a and 19b, a tracking coil 18 and a lens supporting member 15 for supporting these parts.

Elastic supporting members 16a, 16b, 16c, 16d, 16e and 16f are linear and elastic, and have high conductivity. One end of each elastic supporting member is fixed to a support base 17. The other end is fixed to a terminal protrusion 27 formed at the side surface of the lens supporting member 15 so that the movable part 25 is freely displaceable in a focus direction, tracking direction, and radial and tilt direction with respect to the optical disk 1. The elastic supporting members 16a, 16b, 16c, 16d, 16e and 16f are electrically connected to the focus coils 19a and 19b and the tracking coil 18 on the lens supporting member 15.

Further, the optical disk apparatus according to the present invention, as shown in FIG. 7 includes an error signal generation circuit 4 and a control circuit 5 for performing a focus control and a tracking control of the actuator 11. The control circuit 5 provides a control current to the focus coils 19a and 19b and the tracking coil 18 through the elastic supporting members 16a, 16b, 16c, 16d, 16e and 16f.The movable part 25 is driven in the focus, tracking and radial tilt directions by an electromagnetic force generated between this control current and a magnetic flux generated by the permanent magnets 21a, 21b and 21c.

Here, each of the terminal protrusions 27 integrally molded with the lens supporting member 15 is rotated and entwined with the winding wire from each coil, and after that, it is electrically connected to the elastic supporting member by being soldered to the elastic supporting member. The terminal protrusions 27 formed at the side surface of the lens supporting member 15 are arranged at both sides for a plane orthogonal to the optical disk 1 including a tangent line of the recording track of the optical disk 1 in the position of an optical spot. Respective terminal protrusion 27 of each side, shown in FIGS. 1A and 1B, that is, the upper and the lower terminals and the center terminal protrudes in a direction different, that is, in the tracking direction and in the tangential direction of the optical disk, respectively.

Hence, though consideration is required to be given to the interference of the winding wire jig between the upper and lower terminals when entwining the winding wire of each coil, no problem is caused because the center terminal is arranged at a position not causing any interference. Consequently, the interval between the upper and lower terminals is shortened near the limit of the distance interfered by the winding wire, so that the lens supporting member 15 can be made thin and it is possible to make the actuator 11 thin.

The terminal protrusions 27 thus integrally molded with the lens supporting member 15 are protruded not in the same direction but in multiple directions, so that it is possible to shorten the interval between the upper and lower terminals because the problem of interference of the center terminal is eliminated. Thus it is possible to make the actuator thin without having the problems such as interference with the members around the actuator, deterioration of the characteristic of the actuator, deterioration of the operability, and the like.

Next, examples of the present invention will be described.

EXAMPLE 1

FIGS. 2A to 2D are schematic views showing Example 1 of the present invention. FIG. 2A is an enlarged view of a terminal protrusion part according to Example 1, FIG. 2B is a front view of a lens supporting member 15, FIG. 2C is its top view, and FIG. 3D is its side view. Example 1 has basically the same constitution as in FIGS. 1A and 1B. First, a movable part 25 of an actuator 11 is supported by six pieces of elastic supporting members 16a to 16f fixed to a fixed part 26, and is driven in focus, tracking and radial tilt directions with respect to an optical disk 1.

Further, as described above, terminal protrusions 27 are arranged at both sides of a plane orthogonal to the optical disk 1 including a tangent line of a recording track of the optical disk 1, respectively. As shown in FIG. 2A, with respect to the terminal protrusions 27 of one side, while the upper and lower terminals are protruded in the tracking direction, the center terminal is protruded in the tangential direction. On the other side of the lens supporting member 15 also, as described above, three pieces of the terminal protrusions are arranged in the height direction of the lens supporting member 15, and the terminal protrusions of both side are symmetrically arranged.

Each of the terminal protrusions 27 is rotated and entwined with the winding wire terminal from each coil arranged at the movable part 25, and one end of the elastic supporting member supporting the movable part 25 is soldered, so that the winding wire terminal is electrically connected to the elastic supporting member. When the winding wire terminal of the coil is entwined to the terminal protrusion, usually the winding wire jig is used, and since it rotates around the terminal protrusion, a predetermined space is required in the periphery of each terminal protrusion.

Further, with respect to a soldering operation when soldering the winding wire entwined with the terminal protrusion and the elastic supporting member, it is necessary to give consideration to a space for providing a soldering iron and a space for a solder itself. In the present invention, the center terminal is protruded in a direction different from the upper and lower terminals, so that the space for the winding jig and the solder and the like can be easily secured.

Figure 3A:
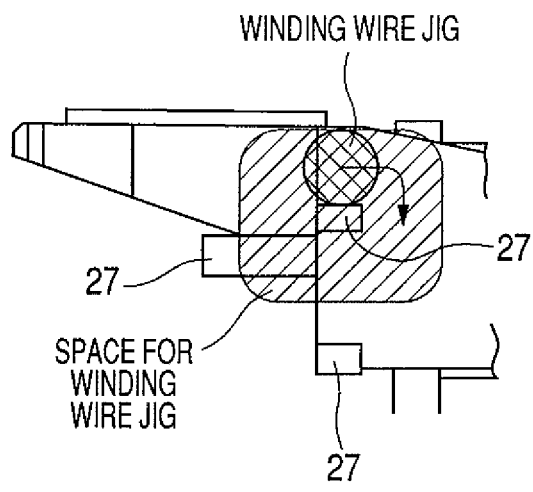
FIGS. 3A and 3B are views for explaining a wounding wire jig space in Example 1 of the present invention.
Figure 3B:
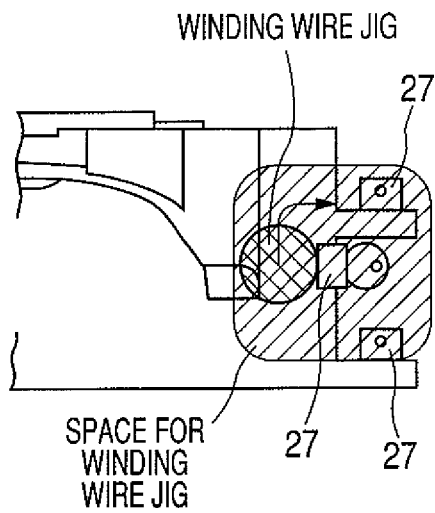

FIGS. 3A and 3B show the terminal protrusion part of the lens supporting member 15, FIG. 3A is a side view thereof, and FIG. 3B is a front view thereof. As shown in FIGS. 3A and 3B, respective terminal protrusions 27 are protruded in multiple directions, so that the winding wire of each coil can be entwined with the terminal from the multiple directions. The range shown by diagonal lines is a space for the winding wire jig.

Figure 4:
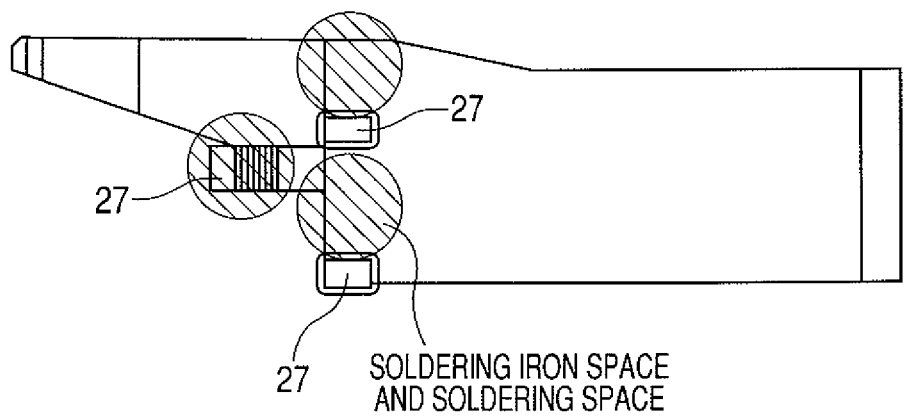
FIG. 4 is a view for explaining a soldering space at a terminal protrusion part in Example 1 of the present invention.

FIG. 4 shows a space for performing a soldering of the terminal protrusion 27 of the lens supporting member 15. As shown in FIG. 4, with respect to a space for performing a soldering (a soldering iron space and a solder space), also, respective terminal protrusions 27 are arranged so as to be protruded in multiple directions, so that the space can be sufficiently secured. Hence, at the assembly time, there arises no trouble, and without deteriorating the characteristic of the actuator 11, the actuator 11 can be made thin.

Incidentally, in the above-mentioned present example, though a plurality of terminal protrusions 27 arranged at both sides of a plane orthogonal to the optical disk including a tangential line of the recording track of the optical disk 1 are symmetrical, the present invention is not limited to symmetrical layout.

EXAMPLE 2

Figure 5A:
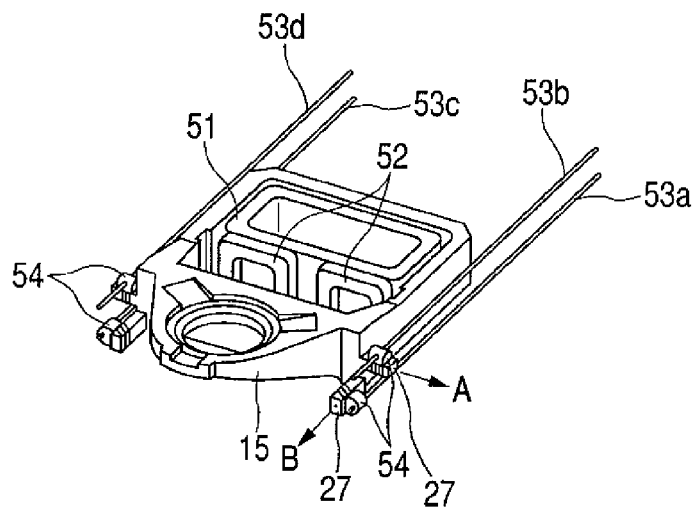
FIGS. 5A, 5B, 5C and 5D are views showing a constitution of the optical pickup in Example 2 of the present invention.
Figure 5B:
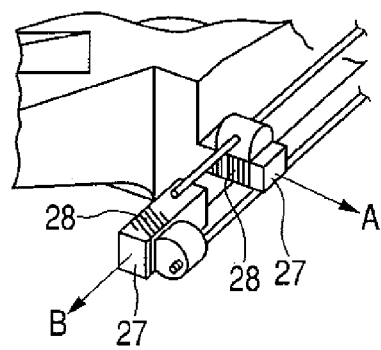
Figure 5C:
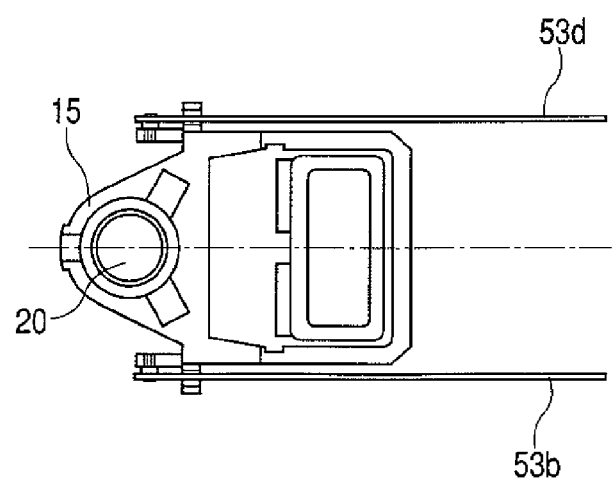
Figure 5D:
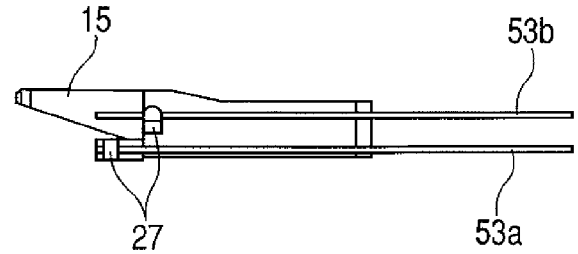

FIGS. 5A to 5D are views showing the constitution of Example 2 of the present invention. FIG. 5A is an oblique view of the vicinity of a lens supporting member, FIG. 5B is an enlarged view of a terminal protrusion part, FIG. 5C is a top view of FIG. 5A, and FIG. 5D is a side view of FIG. 5A. In the present example, as shown in FIGS. 5A to 5D, a movable part 25 is supported by four pieces of elastic supporting members 53a, 53b, 53c and 53d.In Example 2, an example of an actuator for driving the movable part 25 by using one focus coil 51 and a tracking coil 52 will be shown. Hence, in FIGS. 5A to 5D, the movable part 25 is supported by using four pieces of elastic supporting members 53a, 53b, 53c and 53d.Other members are the same as those of Example 1.

Each winding wire 28 of the focus coil 51 and the tracking coil 52 is entwined by rotating it around terminal protrusions 27, and is electrically connected by being soldered (54) to one end each of the elastic supporting members 53a, 53b, 53c and 53d.The movable part 25 is driven in a focus direction and a tracking direction, respectively, by a magnetic force generated in a focus coil 51, a tracking coil 52, and the yoke and magnet of a fixed part.

In the present example, each terminal protrusion arranged on the lens supporting member 15 is arranged at both sides of a plane orthogonal to the optical disk including a tangential line of the recording track of the optical disk. Two pieces of the adjacent terminal protrusions 27 at the side surface of the lens supporting member 15 are protruded in different directions (tracking direction A and tangential direction B in the drawing).

Figure 6A:
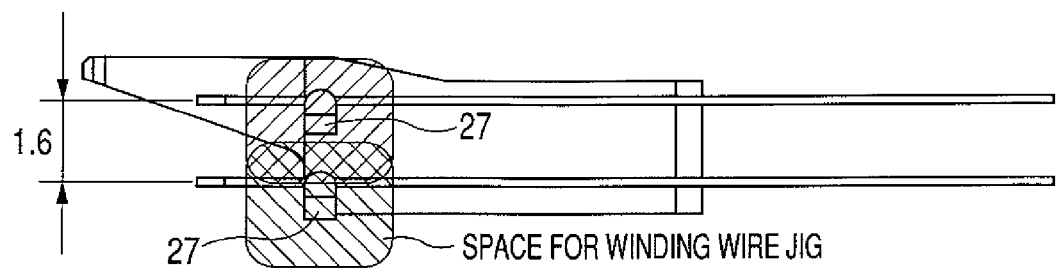
FIGS. 6A and 6B are views for explaining a winding wire jig space in Example 2 of the present invention.
Figure 6B:
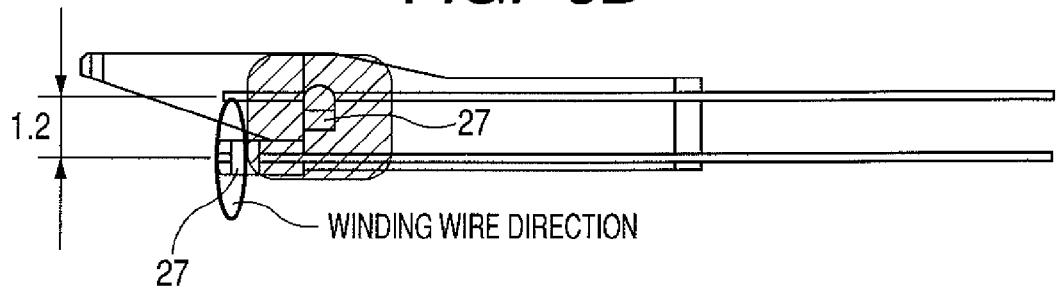

FIGS. 6A and 6B show a comparison of the winding wire jig space between the conventional example and Example 2.The range shown by diagonal lines is a space required for the winding wire jig. FIG. 6A is a layout of the conventional terminal protrusions 27, but since each of one side terminal protrusions is protruded in the same direction, in order to secure the space for the winding wire jig and soldering, as shown in FIG. 6A, a predetermined distance between the terminals is required in the same plane, and hence it is difficult to make the actuator thin.

In contrast to this, in Example 2, as shown in FIG. 6B, since the protruding directions of the adjacent terminal protrusions are different, when the coil winding wire is entwined by the winding wire jig, there is no interference caused between the winding wire jig and the terminal. Further, since a sufficient space can be secured in the vicinity of the terminal part, which is the space for the solder and the soldering iron, operability is good. Consequently, when the terminal layout as shown in FIG. 6B is applied, without deteriorating the characteristics and assembly operability of the actuator, it is possible to make the lens supporting member thin, and to reduce the wire interval from 1.6 mm to 1.2 mm, whereby the entire actuator can be made thin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-272079, filed Sep. 20, 2005, which is hereby incorporated by reference herein in its entirety.

What is claimed is:

1. An optical pickup comprising:
   a movable part including:
   an objective lens;
   an objective lens driving coil;
   a lens supporting member for supporting the objective lens and the driving coil; and
   a plurality of terminal protrusions for connection to the driving coil, the plurality of terminal protrusions being disposed in an arrangement at each side surface of the lens supporting member,
   wherein a first direction in which at least one of the plurality of terminal protrusion protrudes from the lens supporting member is a tangential direction of an optical disk and a second direction in which the other terminal protrusions protrude from the lens supporting member is a tracking direction of the optical disk; and
   a fixed part including:
   a support base for supporting the movable part; and
   supporting members for connecting the movable part with the fixed part,
   wherein the supporting members include a plurality of elastic supporting members and fixing members, with each of the supporting members fixed between the terminal protrusions of the lens supporting member and the support base,
   wherein at least one of the plurality of elastic supporting members is attached to a fixing member fixed on a side surface of the terminal protrusion that protrudes in the tangential direction, and the other elastic supporting members are attached to fixing members fixed on upper surfaces, different from the side surfaces, of the terminal protrusions that protrude in the tracking direction, and
   wherein the driving coil is electrically connected to the elastic supporting members at the terminal protrusions.

2. The optical pickup according to claim 1, wherein the terminal protrusions are integrally formed with the lens supporting member.

3. An optical disk apparatus comprising an optical pickup according to claim 1 mounted thereon.

4. The optical pickup according to claim 1, wherein a tangent line of a recording track of the optical disk lies in a plane of a side surface of the lens supporting member, the plane being opposed to a plane orthogonal to the optical disk.

5. The optical pickup according to claim 1, wherein the fixing members are soldering.

6. An optical pickup comprising:
   a movable part including:
   an objective lens;
   an objective lens driving coil;
   a lens supporting member for supporting the objective lens and the driving coil; and
   a plurality of terminal protrusions for connection to the driving coil, the plurality of terminal protrusions being disposed in an arrangement at each side surface of the lens supporting member,
   wherein a first direction in which at least one of the plurality of terminal protrusion protrudes from the lens supporting member is a tangential direction of an optical disk and a second direction in which the other terminal protrusions protrude from the lens supporting member is a tracking direction of the optical disk; and
   a fixed part including:
   a support base for supporting the movable part; and
   supporting members for connecting the movable part with the fixed part,
   wherein the supporting members include a plurality of elastic supporting members and fixing members, with each of the supporting members fixed between the terminal protrusions of the lens supporting member and the support base,
   wherein at least one of the plurality of elastic supporting members is fixed to a fixing member on a side surface of the terminal protrusion that protrudes in the tangential direction, the side surface being perpendicular to a plane of the surface of the optical lens, and the other elastic supporting members are fixed to fixing members on upper surfaces of the terminal protrusions that protrude in the tracking direction, the upper surfaces being perpendicular to the side surfaces, and
   wherein the driving coil is electrically connected to the elastic supporting members at the terminal protrusions.

* * * * *